May 8, 1934.   A. L. KNAPP   1,957,785
SEAT FOR MOTOR VEHICLES
Filed April 30, 1928   2 Sheets-Sheet 1
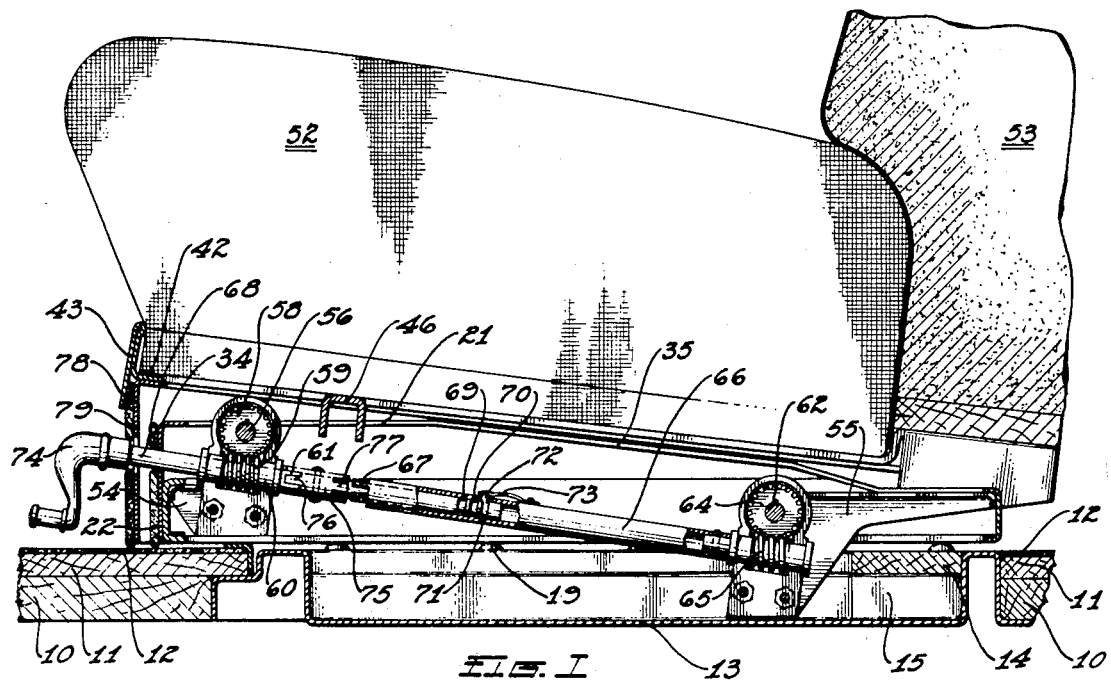
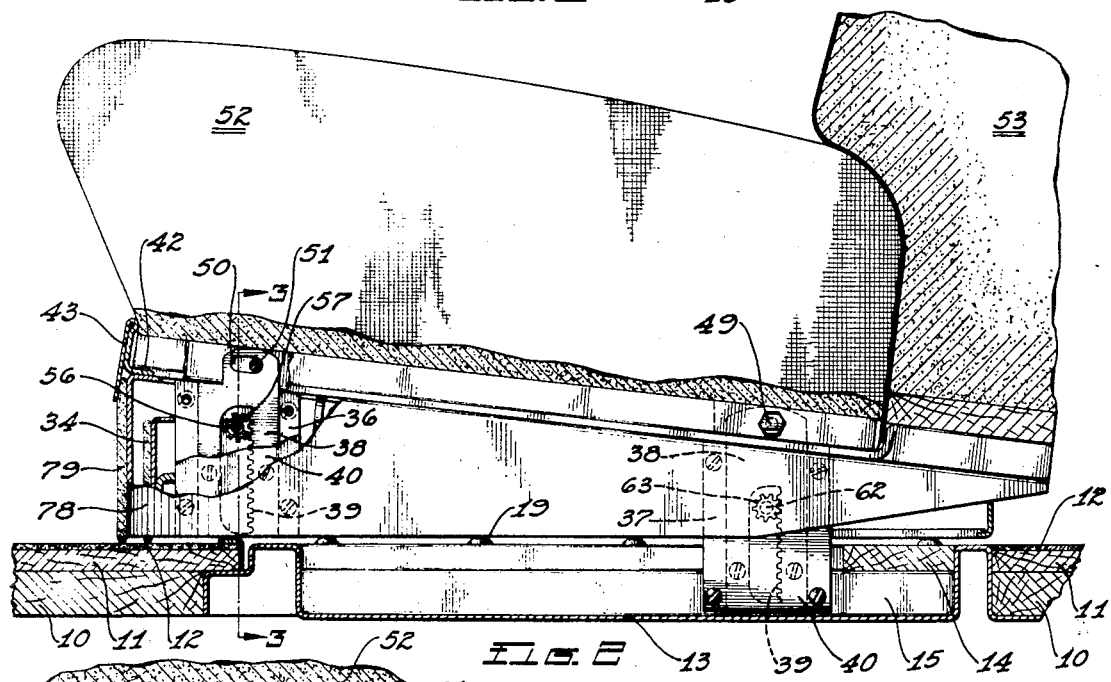
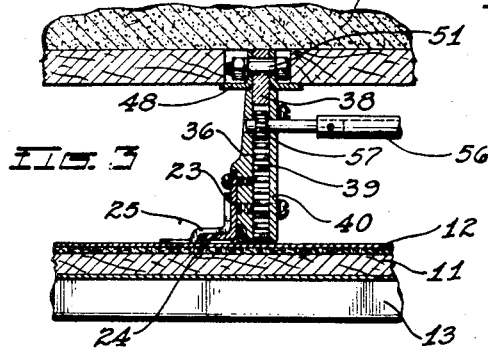
Inventor
ARCHER L. KNAPP.
By
Attorney May 8, 1934.　　　A. L. KNAPP　　　1,957,785
SEAT FOR MOTOR VEHICLES
Filed April 30, 1928　　2 Sheets-Sheet 2
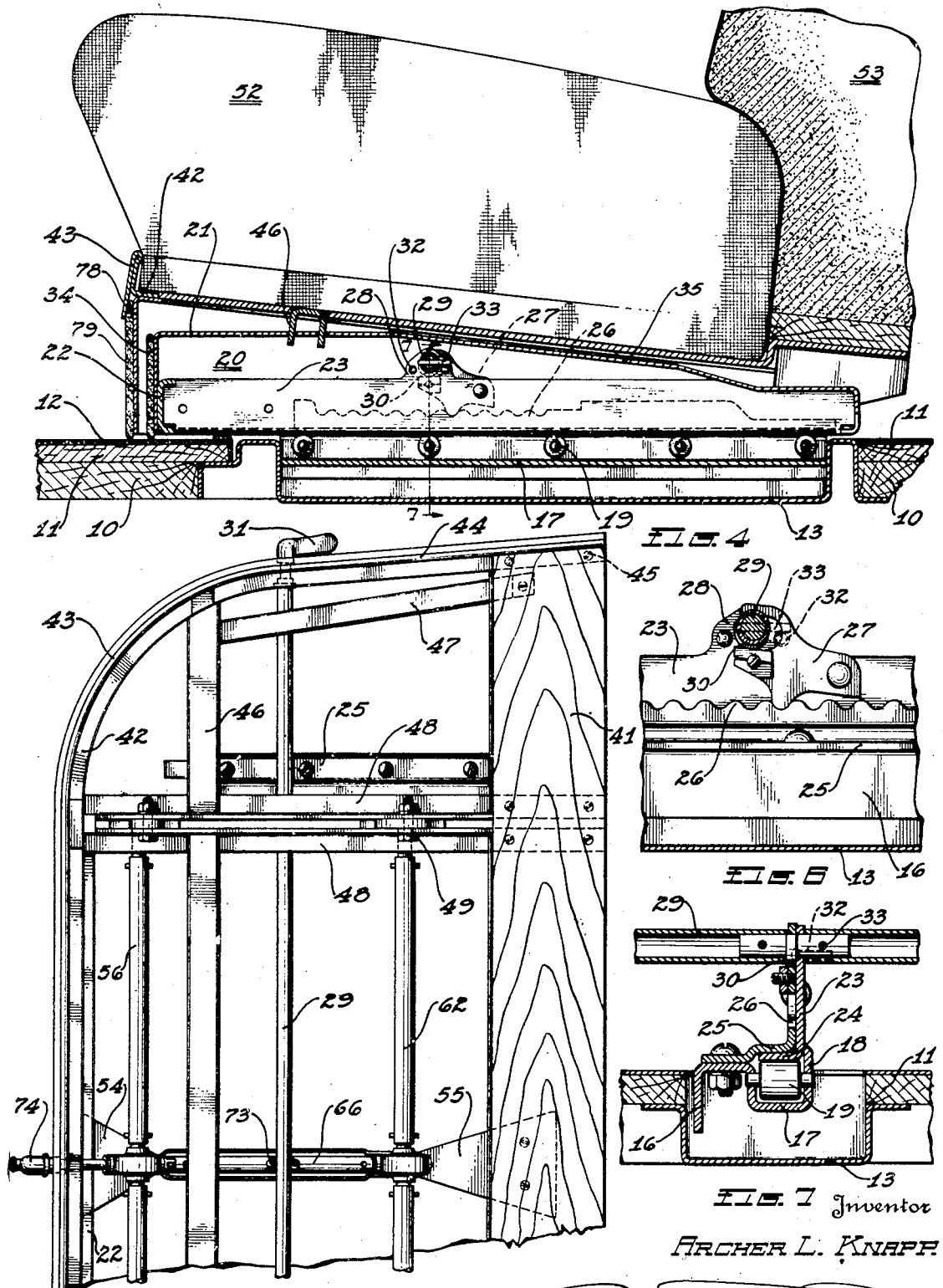

Patented May 8, 1934

1,957,785

UNITED STATES PATENT OFFICE 1,957,785

SEAT FOR MOTOR VEHICLES

Archer L. Knapp, Detroit, Mich., assignor to Packard Motor Car Company, Detroit, Mich., a corporation of Michigan Application April 30, 1928, Serial No. 273,881

4 Claims. (Cl. 155—5)

This invention relates to motor vehicles and more particularly to body structure.

An object of the invention is to provide an adjustable vehicle seat.

Another object of the invention is to provide a vehicle seat adjustable forwardly and backwardly relative to the operating pedals of the vehicle.

Another object of the invention is to provide an adjustable seat with means whereby the seat may be easily and quickly moved forwardly and backwardly and locked in adjusted position.

A further object of the invention is to provide means for raising, lowering and tilting a vehicle seat whereby the seat may be adjusted according to the requirements of the operator.

A still further object of the invention is to provide means for adjusting a vehicle seat forwardly, backwardly, upwardly and downwardly and tilting the seat whereby the desired or required position may be attained.

Other objects of the invention will appear from the following description taken in connection with the drawings, which form a part of this specification, and in which:

Figure 1 is a side elevation of a vehicle seat, partly in section, illustrating the means for raising, lowering and tilting the seat.

Figure 2 is a similar view illustrating racks and pinions for raising, lowering and tilting the seat, Figure 3 is a sectional view taken substantially on line 3—3, Fig. 2, with parts broken away, Figure 4 is also a side elevation with parts in section showing the means for adjusting the seat laterally, Figure 5 is a top plan view of the seat frame, partly broken away, Figure 6 is an enlarged detail view of the cam for locking the seat against lateral movement, and Figure 7 is an enlarged detail view illustrating means for mounting the seat carrier.

Referring to the drawings for more specific details of the invention, 10 represents adjacent cross sills of a motor vehicle body frame and 11 the floor boards of the body. The floor boards are carpeted as indicated at 12 and the sills and floor boards are spaced to provide an opening for the reception of a pan 13 suitably secured in position and adapted to provide a front seat compartment. Arranged longitudinally within the pan and transversely with respect to the body is a filler 14 supported by a bracket 15.

Positioned transversely within the pan at each end thereof is a support 16 having a channel member 17 provided with an extended side 18, the purpose of which will hereinafter appear, and mounted in the channel in spaced relation are rollers 19 providing suitable runways for a seat carrier 20. As shown, the seat carrier comprises a substantially rectangular band or shell 21 reinforced by side plates 22 connected by end plates 23. The end plates are provided with flanges 24 which bear upon the rollers 19 and are held in engagement therewith by the extended sides 18 on the channel members 17 and retaining plates 25 bolted or otherwise secured to the supports.

The retaining plates 25 have formed upon their upper edges ratchets 26 adapted for engagement by pawls 27 pivoted on the plates 23, and rotatably mounted in oppositely disposed bosses 28 formed on the plates 23 is a shaft 29 having thereon cams 30 adapted upon rotation of the shaft to actuate the pawls 27 for engagement and disengagement with the ratchets, the shaft being rotated by means of a suitable handle 31 attached to one end thereof beyond the end of the seat and limited in its movement by means of stops 32 adaptable for engagement with a pin 33 extending diametrically through the shaft.

Upon turning the shaft in one direction the pawls are raised to disengage the ratchets whereupon the seat may be shifted or moved forwardly or backwardly at the pleasure of the operator and upon turning the handle into the reverse direction the pawls are lowered to engage the ratchets to secure or lock the seat against such movements.

The seat carrier 20 is covered by a suitable trim or carpet 34 and a portion of the upper edge of the carrier is inclined as indicated at 35, the purpose of which will hereinafter appear. Bolted or otherwise secured to the plate 23 on the seat carrier are vertical supports arranged in pairs indicated at 36 and 37, the pair 36 being positioned adjacent the forward end of the carrier and extending upwardly to an elevation above the pair 37 which is arranged adjacent the rear end of the carrier. Each of these supports has mounted therein for reciprocation a slide 38 provided with a longitudinal slot in which is arranged a rack 39. The slide 38 is retained in position by a face plate 40 suitably secured as by bolts threaded into the support.

A seat frame is mounted on the slides 38. As shown, the seat frame comprises a back member 41 and a front member 42, the front member being bent to provide a retaining member 43 and the ends thereof are bent backwardly to form the end members 44 of the frame which are secured to the back member as indicated at 45. This frame is suitably braced as by a longitudinal brace 46 connected between the end members 44 and by suitable brackets 47 connecting the longitudinal brace 46 to the back member 41.

The seat frame is further provided with transverse members 48 spaced to receive the upper ends of the slides 38. The slides positioned in the supports 37 are pivotally connected between the transverse members 48 as indicated at 49 and the slides 38 in the supports 36 are slotted as indicated at 50 to receive bolts 51 passing transversely through the members 48. This structure permits tilting of the seat frame either forwardly or backwardly. A cushion 52 is removably supported on the seat frame, the cushion frame being slotted to fit over the members 48 and a back 53 for the seat is permanently secured on the frame in the preferred position.

Positioned centrally upon the reinforcing plate 22 on the carrier frame is a bracket 54 and arranged in an oppositely disposed position on the opposite reinforcing plate on the carrier frame is a bracket 55. The bracket 54 is intermediate the pair of supports 36 and the bracket 55 is intermediate the pair of supports 37. The bracket 54 supports a longitudinal shaft 56, the respective ends of which are journaled in the supports 36, and keyed on this shaft are pinions 57 in mesh with the racks 39 on the slides 38 on the supports 36. The shaft 56 also has keyed thereupon a gear 58 in mesh with a worm gear 59 formed on a sleeve 60 rotatably mounted on the bracket 54 and provided at one end with dogs 61, the function of which will hereinafter appear.

The bracket 55 supports a longitudinal shaft 62 parallel to the shaft 56. The shaft 62 has its respective ends journaled in the supports 37 and keyed to the shaft are pinions 63 in mesh with the racks 39 in the slides 38 on the supports 37. The shaft 62 also has keyed thereon a gear 64 in mesh with a worm gear 65 rotatably mounted on the bracket 55 and adapted to be driven by a shaft 66 suitably supported in alinement with the sleeve 60 on the bracket 54. As shown, the shaft 66 is hollow and is provided upon its end adjacent the sleeve 60 with dogs 67.

A shaft 68 is slidably and rotatably mounted in the sleeve 60 and the end of the hollow shaft 66. This shaft is provided upon its end positioned in the hollow shaft with three circumferential groves 69, 70 and 71, each adapted to register according to the lateral adjustment of the shaft with an aperture in the hollow shaft in which is positioned a ball 72 adapted to be pressed in engagement with the grooves 69, 70 and 71 by a spring 73 positioned on the shaft. The other end of the shaft is provided with a crank handle 74 and pinned to the shaft intermediate the sleeve 60 and the adjacent end of the hollow shaft 66 is a sleeve 75 having on its respective ends dogs 76 and 77 adapted upon reciprocation of the shaft to engage either the dogs 61 of the sleeve 60 or the dogs 67 upon the shaft 66 or both according to the position of the sleeve 75. The seat frame is provided with a skirt 78 having upon the face thereof a suitable trim 79. When the seat is lowered to its minimum height the skirt 78 fully covers the carrier frame 20 and when the seat is raised that portion of the carrier frame which would otherwise be exposed is concealed by the trim 34 on the face of the shell 21 as clearly shown in Figs. 1, 2 and 4.

In operation, the handle 31 upon the shaft 29 is moved to rotate the shaft 29 through an arc of 180° whereupon the cams 30 raise the pawls 27 from engagement with the ratchets 26 on the retaining plates 25 in which position the seat may be freely moved forwardly or backwardly at the pleasure of the operator and when adjusted to the desired position the handle 31 is thrown back in the reverse direction rotating the shaft 29 through an arc of 180° to lower the pawls 27 in engagement with the ratchets 26 in which position they are locked by the cams 30.

After adjusting the seat to the desired lateral position the seat is further made adjustable as to the incline thereof by raising either the back of the seat or the forward end thereof. When it is desired to raise the front of the seat, the handle 74 is pulled outwardly to engage the dogs 61 upon the sleeve 60 with the dogs 76 upon the sleeve 75 in which position the shaft 68 is held by the spring pressed ball 72 engaging the circumferential groove 71. With the shaft 68 in this position, upon the rotation thereof by the handle 74, the worm gear 59 is driven and as this gear is in mesh with the gear 58 on the shaft 56, the shaft 56 is rotated and the pinions 57 carried thereby in mesh with the ratchets 39 on the slides 38 are driven to actuate the slides to raise or lower the front of the seat to obtain the desired incline.

When it is desired to raise or lower the rear of the seat, the shaft 68 is shifted inwardly to disengage the dogs 61 on the sleeve 60 with the dogs 76 on the sleeve 75 and to engage the dogs 67 on the shaft 66 with the dogs 77 on the sleeve 75, in which position the ball 72 engages the circumferential groove 69 on the shaft 68. With the shaft in this position it is rotated by the handle 74 to drive the worm gear 65 which meshes with and drives the gear 64 on the shaft 66 to rotate the shaft and to drive the pinions 63 on the ends thereof which mesh with the ratchets 39, the handle being rotated in one direction to raise the rear of the seat and in the reverse direction to lower the rear of the seat.

The seat may be further adjusted as to elevation by moving the handle either inwardly or outwardly to engage the dogs 76 on the sleeve 75 with the dogs 61 on the sleeve 60 and the dogs 77 on the sleeve 75 with the dogs 67 on the shaft 66, in which position the ball 72 is urged by the spring 73 to engage the circumferential groove 70. When in this adjusted position, by rotating the shaft 68 by means of the crank handle 74 the seat may be raised or lowered at will.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of my invention, what I claim as new and desire to secure by Letters Patent is:

1. An adjustable seat comprising parallel supports, rollers on the supports, a frame movable on the rollers, uprights carried by the frame, slides on the uprights, a seat supported on the slides and means for moving the slides to raise, lower and tilt the seat.

2. An adjustable seat comprising parallel supports, rollers positioned on the supports, a frame movable on the rollers, means for retaining the frame on the rollers, means for securing the frame in a fixed position, uprights carried by the frame, slides on the uprights, a seat supported on the slides and a single operating means for raising, lowering and tilting the seat.

3. An adjustable seat comprising supports, rollers positioned thereon, a frame movable on the rollers, means for retaining the frame upon the rollers, means for securing the frame in a fixed position, uprights carried by the frame, slides on the uprights, a seat supported on the slides, a single gearing connected to the slides, and means for operating the gearing to move the slides to raise, lower and incline the seat.

4. An adjustable seat comprising parallel supports, rollers on the supports, a frame movable on the rollers, means for retaining the frame on the rollers, interlocking means between the supports and the frame, uprights carried by the frame, slides on the uprights, a seat supported on the slides, racks formed on the slides, parallel shafts supported by the uprights, pinions on the shafts engaging the racks, gearing for driving the shafts and means for operating the gearing to rotate the shafts concomitantly and selectively to move the slides for raising, lowering and inclining the seat.

ARCHER L. KNAPP.